United States Patent
Kitch et al.

(10) Patent No.: US 6,813,328 B2
(45) Date of Patent: Nov. 2, 2004

(54) NUCLEAR REACTOR SUBMERGED HIGH TEMPERATURE SPOOL PUMP

(75) Inventors: David Michael Kitch, Export, PA (US); Joseph Michael Kujawski, Export, PA (US); Dale R. Farruggia, Pitcairn, PA (US); Jose Luis Matos, Pittsburgh, PA (US); Chris T. Farr, North Huntingdon, PA (US)

(73) Assignee: Curtiss-Wright Electro-Mechanical Corporation, Cheswick, PA (US)

( * ) Notice: Subject to any disclaimer, the term of this patent is extended or adjusted under 35 U.S.C. 154(b) by 82 days.

(21) Appl. No.: 10/318,588

(22) Filed: Dec. 13, 2002

(65) Prior Publication Data

US 2004/0114705 A1 Jun. 17, 2004

(51) Int. Cl.[7] ............................................. G21C 19/28
(52) U.S. Cl. ....................... 376/406; 376/395; 376/347; 376/361; 417/356
(58) Field of Search ................................. 376/406, 395, 376/347, 361, 260; 417/356; 174/152; 310/54

(56) References Cited

U.S. PATENT DOCUMENTS

| | | | |
|---|---|---|---|
| 2,887,061 A | | 5/1959 | Cametti et al. |
| 2,887,062 A | | 5/1959 | Cametti et al. |
| 3,086,933 A | * | 4/1963 | Nagey et al. ............... 376/352 |
| 3,325,374 A | * | 6/1967 | Margen ........................ 376/406 |
| 3,981,621 A | * | 9/1976 | Considine ................. 417/44.11 |
| 4,057,467 A | * | 11/1977 | Kostrzewa ................... 376/406 |
| 4,072,563 A | * | 2/1978 | McDonald et al. .......... 376/406 |
| 4,135,936 A | * | 1/1979 | Ballard, Jr. ..................... 501/5 |
| 4,507,521 A | * | 3/1985 | Goellner ...................... 174/151 |
| 4,526,742 A | * | 7/1985 | Hannerz ...................... 376/282 |
| 4,652,218 A | * | 3/1987 | Tsutsui et al. ............... 417/368 |
| 4,786,762 A | * | 11/1988 | Bowsky et al. ....... 174/152 GM |
| 4,831,297 A | | 5/1989 | Taylor et al. |
| 4,859,406 A | * | 8/1989 | Hannerz ...................... 376/406 |
| 4,897,240 A | * | 1/1990 | Sako ........................... 376/328 |
| 5,053,190 A | * | 10/1991 | Gardner et al. ............. 376/366 |
| 5,101,128 A | | 3/1992 | Veronesi et al. |
| 5,108,323 A | | 4/1992 | Veronesi et al. |
| 5,185,545 A | | 2/1993 | Veronesi et al. |
| 5,205,653 A | | 4/1993 | Veronesi et al. |
| 5,220,231 A | | 6/1993 | Veronesi et al. |
| 5,252,875 A | | 10/1993 | Veronesi et al. |

(List continued on next page.)

FOREIGN PATENT DOCUMENTS

| | | | |
|---|---|---|---|
| CH | 436506 | * | 12/1967 |
| DE | 1 215 824 | * | 5/1966 |
| EP | 0 164 525 A1 | * | 12/1985 |
| GB | 912208 | * | 12/1962 |
| JP | 0825704 A2 | * | 2/1998 |

OTHER PUBLICATIONS

Babala et al., "Pressurized Water Reactor Inherent Core Protection by Primary System Thermohydraulics," Nuclear Science and Engineering 90, 1985, pp. 400–410.*

Carelli, Mario D. et al. "Understanding IRIS Technology" *INFOCAST*, Feb. 8, 2002.

*Primary Examiner*—Michael Carone
*Assistant Examiner*—R Palabrica
(74) *Attorney, Agent, or Firm*—Reed Smith LLP (57) ABSTRACT

A fluid pump utilizing a canned rotor and canned stator is provided. The fluid pump has increased insulative properties over past "spool-type" pumps and has an increased ability to cool the stator, making it suitable for high temperature applications. A nuclear reactor is also provided. The reactor comprises a reactor vessel, that contains a nuclear fuel, control rods, reactor coolant and a reactor coolant pump for providing the reactor coolant to a steam generator. In a preferred embodiment, a steam generator is also provided inside the reactor vessel.

6 Claims, 9 Drawing Sheets

U.S. PATENT DOCUMENTS

| | | |
|---|---|---|
| 5,257,952 A | 11/1993 | Veronesi et al. |
| 5,289,068 A | 2/1994 | Veronesi et al. |
| 5,374,810 A * | 12/1994 | Gantt .......................... 219/670 |
| 5,408,155 A | 4/1995 | Dickinson et al. |
| 5,490,768 A | 2/1996 | Veronesi et al. |
| 5,494,413 A * | 2/1996 | Campen et al. ............. 417/356 |
| 5,522,335 A | 6/1996 | Veronesi et al. |
| 5,713,727 A | 2/1998 | Veronesi et al. |
| 5,795,135 A | 8/1998 | Nyilas et al. |
| 6,059,539 A | 5/2000 | Nyilas et al. |
| 6,259,760 B1 * | 7/2001 | Carelli et al. ............... 376/346 |
| 6,482,054 B2 * | 11/2002 | Treaster et al. ............... 440/38 |

* cited by examiner

NUCLEAR REACTOR SUBMERGED HIGH TEMPERATURE SPOOL PUMP

FIELD OF THE INVENTION

The present invention relates generally to fluid circulation pumps. More particularly, it relates to fluid pumps suitable for use in connection with a nuclear reactor.

DISCUSSION OF RELATED ART

Spool-type fluid pumps have traditionally been used to move fluids as part of a chemical process, or to propel sub-sea vessels. Spool-type fluid pumps generally comprise two concentric cylinders. The outer cylinder contains the pump stator, while the inner cylinder contains the pump rotor. Impeller(s) are connected to a central hub and extend out to, and connect with, the inner cylinder. When power is supplied to the stator, an electromagnetic field is generated, causing the inner cylinder, including the impeller(s), to rotate.

The inner and outer cylinders are sealed or "canned" in order to prevent fluid from coming in contact with the internals of the rotor and stator. Generally, there exists a small gap between the inner and outer cylinders, which can be filled with water in order to cool the rotor and stator. The water has been provided through a fluid circulation channel that may be disposed in the central hub and run through one of the impellers to a gap between the cylinders. Alternatively, the fluid circulation channel may begin at one end of the pump as a gap between the inner cylinder and the outer cylinder. The water flows through the channel between the inner cylinder and the outer cylinder and exits through a gap between the inner cylinder and the outer cylinder at the other end of the pump. The traditional designs are inadequate in terms of cooling when the pump is used in connection with high temperature applications.

Nuclear reactors have traditionally utilized shaft seal pumps or canned motor pumps, that are connected between the steam generator and the reactor vessel by large coolant piping for circulating coolant from the reactor vessel through the steam generator. The steam generator and pump are located outside the reactor vessel, with the reactor coolant being circulated by the pumps through the reactor vessel, steam generator, piping system and through the pumps. The pump casing becomes part of the primary pressure boundary surface.

The shaft seal pump used for nuclear reactor coolant pumping is traditionally a vertical single stage pump having a motor driver connected by a coupling. The motor is either an air cooled or water cooled squirrel cage induction design, but is located outside of the pump casing. A shaft seal assembly seals the reactor coolant inside the pump.

Because radioactive fluid is being moved through the pump and the coolant piping, any leaks in the shaft seal, pump casing, vessel opening and closure should be avoided. Therefore, it is desirable to provide a nuclear reactor configuration that decreases the likelihood of such leaks.

SUMMARY OF THE INVENTION

In one embodiment the fluid pump comprises a sealed annular stator having a generally cylindrical passage extending therethrough, with the stator having energizing means for electrically connecting a plurality of stator windings to a source of electrical power. The fluid pump further comprises an impeller assembly rotatably mounted in the generally cylindrical passage in the housing. The impeller assembly comprises an impeller and a sealed rotor mounted around the perimeter of the impeller and positioned inside the stator to form an electric motor, the operation of which rotates the impeller to produce a pressurized flow of fluid through the generally cylindrical passage in the housing. The fluid pump further comprises at least one radial bearing mounted between the impeller assembly and the housing, a hub centrally positioned in the generally cylindrical passage in the housing and secured to the housing by at least one impeller blade, the impeller assembly rotatably supported on the hub, and insulation material disposed within the stator, the insulation material consisting essentially of mica, glass and ceramics.

In another embodiment, the fluid pump comprises a sealed annular stator having a generally cylindrical passage extending therethrough, with the stator-having energizing means for electrically connecting a plurality of stator windings to a source of electrical power. The fluid pump further comprises an impeller assembly rotatably mounted in the generally cylindrical passage in the housing. The impeller assembly comprises an impeller and a sealed rotor mounted around the perimeter of the impeller and positioned inside the stator to form an electric motor, the operation of which rotates the impeller to produce a pressurized flow of fluid through the generally cylindrical passage in the housing. The fluid pump further comprises at least one radial bearing mounted between the impeller assembly and the housing, a hub centrally positioned in the generally cylindrical passage in the housing and secured to the housing by at least one impeller blade, and cooling tubes having an inlet downstream of the impeller and an outlet upstream of the impeller, the cooling tubes disposed at least partially within the stator.

In another embodiment, the nuclear reactor comprises a reactor vessel, nuclear fuel, a plurality of control rods, reactor coolant, at least one steam generator, and at least one reactor coolant pump, wherein the nuclear fuel, the control rods, the reactor coolant and the reactor coolant pump are all located inside the reactor vessel.

BRIEF DESCRIPTION OF THE DRAWINGS

The various features and benefits of the present invention are apparent in light of the following detailed description and the accompanying drawings, in which.

DETAILED DESCRIPTION OF THE INVENTION

Figure 1A:
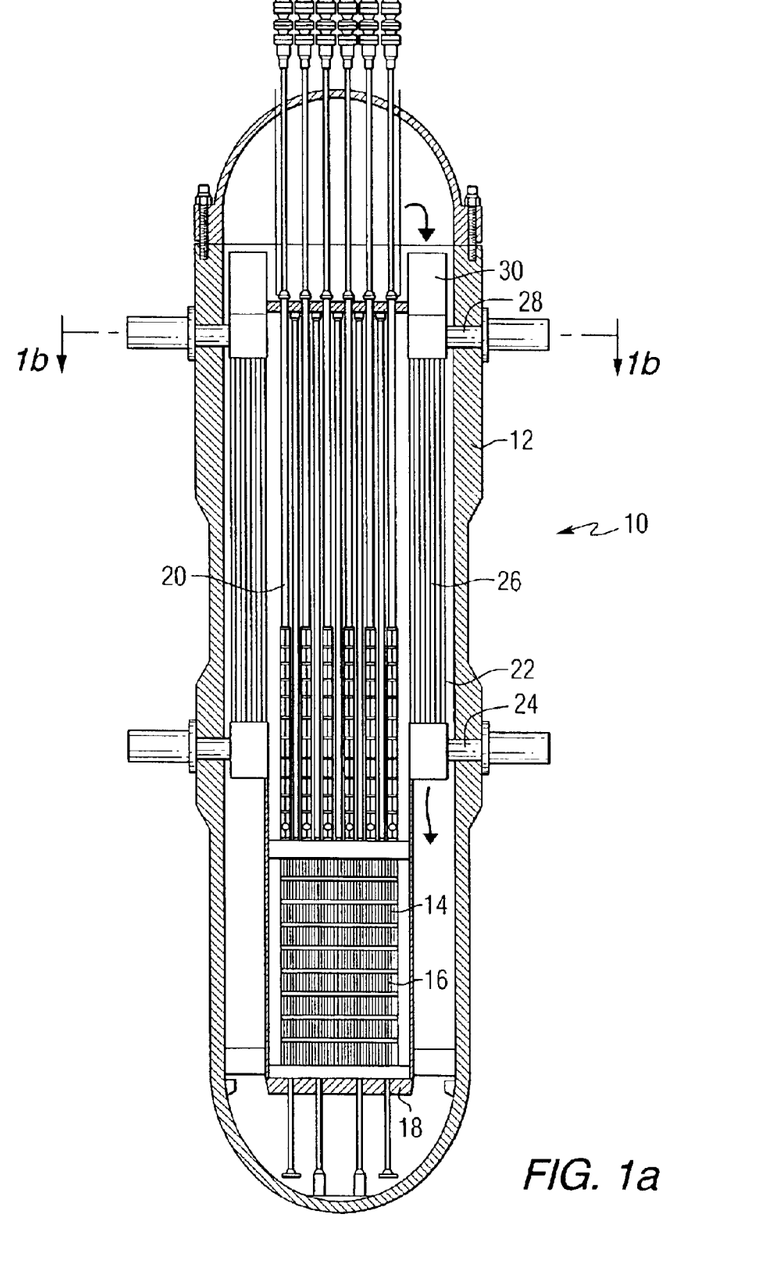
FIG. 1a is a largely schematic, cross-sectional view of a nuclear reactor.
Figure 1B:
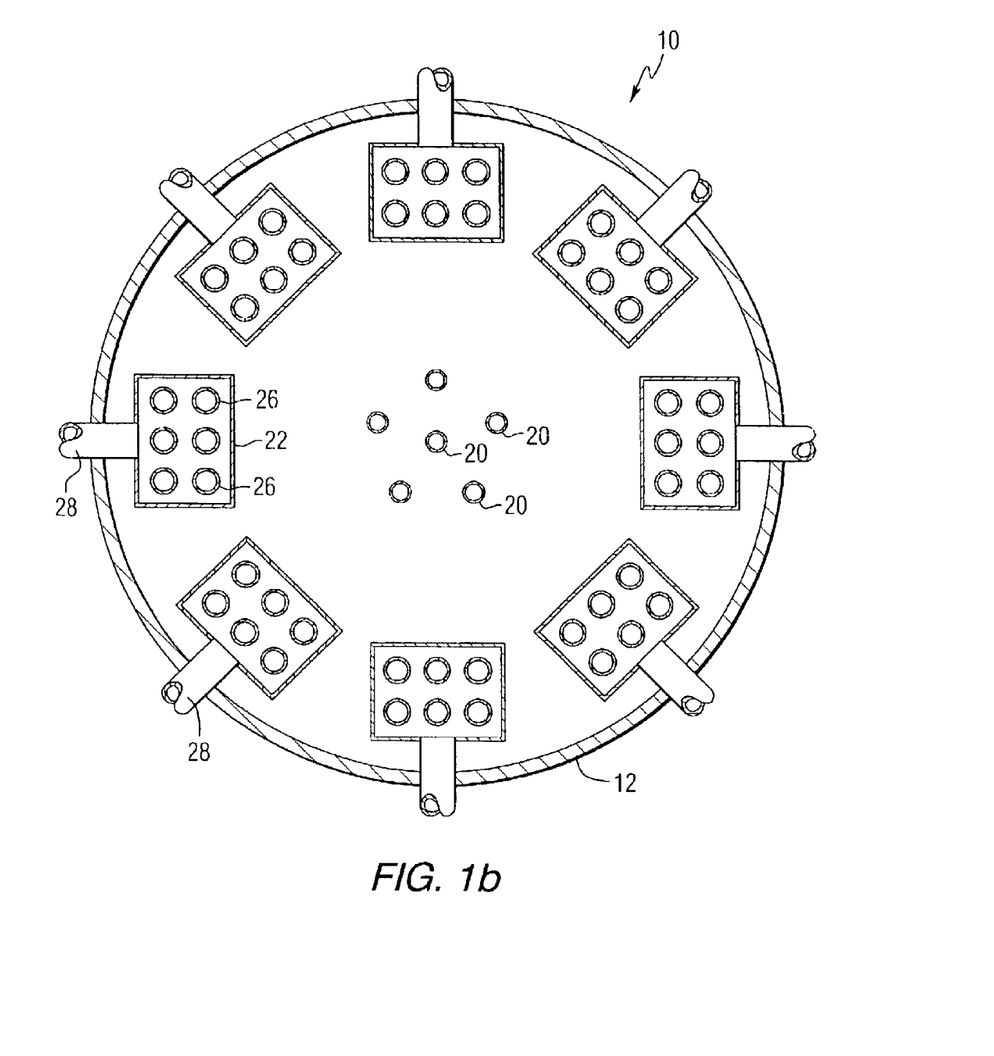
FIG. 1b is an largely schematic, cross-sectional view of the nuclear reactor illustrated in FIG. 1a, taken along line 1b—1b.

Referring to FIGS. 1a and 1b, nuclear reactor 10 includes a reactor vessel 12 that contains the reactor core 14. The reactor core 14 contains nuclear fuel 16 that is disposed on a support structure 18. The nuclear fuel 16 undergoes a fission reaction that generates the heat that is used to generate electric power. The reactor 10 further includes a plurality of control rods 20 that can be inserted into the nuclear fuel 16 in order to control the reaction. The control rods 20 are preferably arranged in a honeycomb configuration, but can be arranged in any configuration known to those skilled in the art.

The fission reaction generates a significant amount of heat. That heat is transferred to reactor coolant water that is present inside the vessel 12. A plurality of steam generators 22 may also be included inside the vessel 12, for example, eight steam generators 22 may be included. Preferably, the steam generators are disposed along the inside walls of the vessel 12. The steam generators 22 are essentially heat exchangers, such as a shell and tube heat exchanger, designed to extract the heat from the reactor coolant. Feedwater is supplied to the steam generator 22 through a feedwater inlet pipe 24. The feedwater passes through the steam generator 22 on the outside of pipes 26, where it absorbs the heat from the reactor coolant flowing through pipes 26 until it becomes steam. The steam leaves the steam generator 22 and the vessel 12 through a steam outlet pipe 28. The steam is eventually utilized in a plurality of turbines (not shown) to produce electric power. Alternatively, the steam generator 22 may be located outside the vessel, with piping connecting the steam generator 22 to the vessel 12.

In accordance with an embodiment of the present invention, the reactor coolant is circulated to the steam generator 22 by a spool pump 30 connected to steam generator 22. The spool pump 30 and steam generator 22 are located inside the vessel 12. The spool pump 30 draws coolant from the vessel 12 and pumps it through the steam generator 22. The coolant flows through pipes 26 as it passes through the steam generator 22, and heat is transferred from the coolant to the feedwater occurs across the walls of the pipes 26. Once cooled, the feedwater flows out of the steam generator 22 and back into the coolant in vessel 12.

Figure 2:
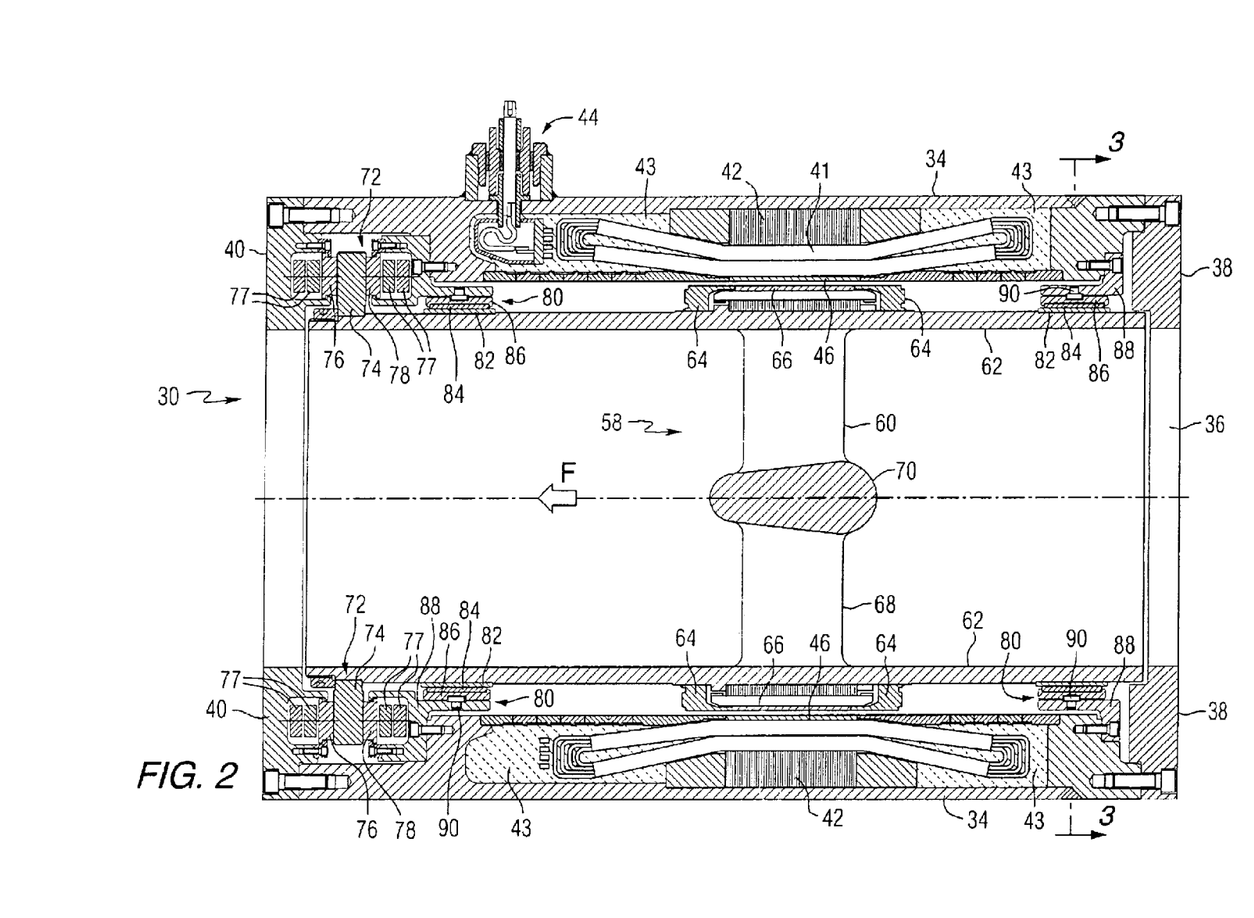
FIG. 2 is a cross-sectional view of a spool pump.

FIG. 2 illustrates an embodiment of the spool pump 30 used to pump the coolant through the steam generator 22. The pump 30 includes a generally cylindrical housing 34 having a generally cylindrical passage 36 extending therethrough. The housing 34 also includes end caps 38, 40 for connecting the housing 34 in series with the steam generator 22 (as shown in FIG. 1a).

The pump 30 further includes a hermetically sealed annular stator 42 mounted inside the housing 34. The stator 42 has a terminal gland 44 thereon for connecting the stator 42 to a source of electrical power located outside the vessel 12. The stator 42 is hermetically sealed by a stator can 46.

Impeller assembly 58 is rotatably mounted inside the passage 36 of the housing 34 The impeller assembly 58 comprises an axial flow impeller 60 and an annular rotor 64 mounted around the perimeter of the impeller 60 on a cylindrical shaft 62. The rotor 64 and the stator 42 cooperate to form an induction motor. The rotor 64 is preferably a squirrel cage rotor, so that no electrical connections to the rotor are required. It will be appreciated by those skilled in the art, however, that the motor could be a synchronous motor or a permanent magnet motor. If a squirrel cage motor design is used, the rotor 64 will comprise steel laminations and copper alloy rotor bars, as is known in the art. If a synchronous motor is employed, the rotor 64 may be comprised of permanent magnets. The rotor 64 is hermetically sealed by a rotor can 66. Both the stator can 46 and the rotor can 66 preferably comprise thin-walled alloy cans such as Inconel or Hastelloy cans.

The impeller 60 has a plurality of blades 68 mounted on and extending radially outwardly from a cylindrical hub 70. In a preferred embodiment, 5 to 9 blades 68 are provided. It will be appreciated, however, that the optimum number of blades will depend on the desired performance of the pump 30 and may be determined in a manner known to those skilled in the art. The blades 68 are pitched so as to create an axial flow in the pumped fluid in the direction F through the passage 36 in the housing 34 when the impeller 60 is rotated.

The impeller 60 is preferably a high specific speed impeller. Specific speed ($N_S$) is a non-dimensional design index used to classify pump impellers as to type and proportion. It is defined as the speed in revolutions per minute at which a geometrically similar impeller would operate if it were of such a size to deliver one gallon per minute against one foot head. $N_S$ is calculated using the formula:

$$N_S = \frac{NQ^{1/2}}{H^{3/4}}$$

where
  N=pump impeller speed in revolutions per minute
  Q=capacity in gallons per minute at the best efficiency point
  H=total head per stage at the best efficiency point.

In the embodiment illustrated in FIG. 1a, the impeller 60 is of a configuration to yield a specific speed of about 9,000 or higher at a speed of 1800 rpm.

As noted above, the nuclear reaction generates a significant amount of heat, which is transferred to the reactor coolant water, which is the fluid pumped by the spool pump 30. The coolant temperature will often exceed 300° C. At that temperature, the water used as the coolant has a very low viscosity. The higher the specific speed of the impeller, the steeper the pump characteristic curve, with the thrust load being the greatest at zero flow, or what is called "shut off flow." The higher specific speed requires a larger thrust bearing to accommodate the high thrust at shut off flow. In accordance with an embodiment of the present invention, a double acting thrust bearing 72 is located on one side of impeller 68. The thrust bearing 72 comprises a thrust bearing runner 74 and two sets of bearing pads 76, 78. The thrust bearing runner 74 is a carbon graphite-based ring that is shrink fitted on to the shaft 62. The thrust bearing runner 74 may also be manufactured from another hard solid material such as a carbide, a nitride, stainless steel or another appropriate material that is known to those skilled in the art. Two bearing pads 76, 78 form the self-aligning tilt pad design and are positioned on opposite sides of the thrust bearing runner 74. The bearing pads 76, 78 are made from 431 stainless steel (or a comparable alloy) that is chrome plated or hard faced, for both corrosion and wear resistance. A plurality of thrust pad retainers 77 are also included in order to keep the thrust bearing pads 76 and 78 in place. The thrust pad retainers are located outside of the bearing pads 76, 78.

Figure 3:
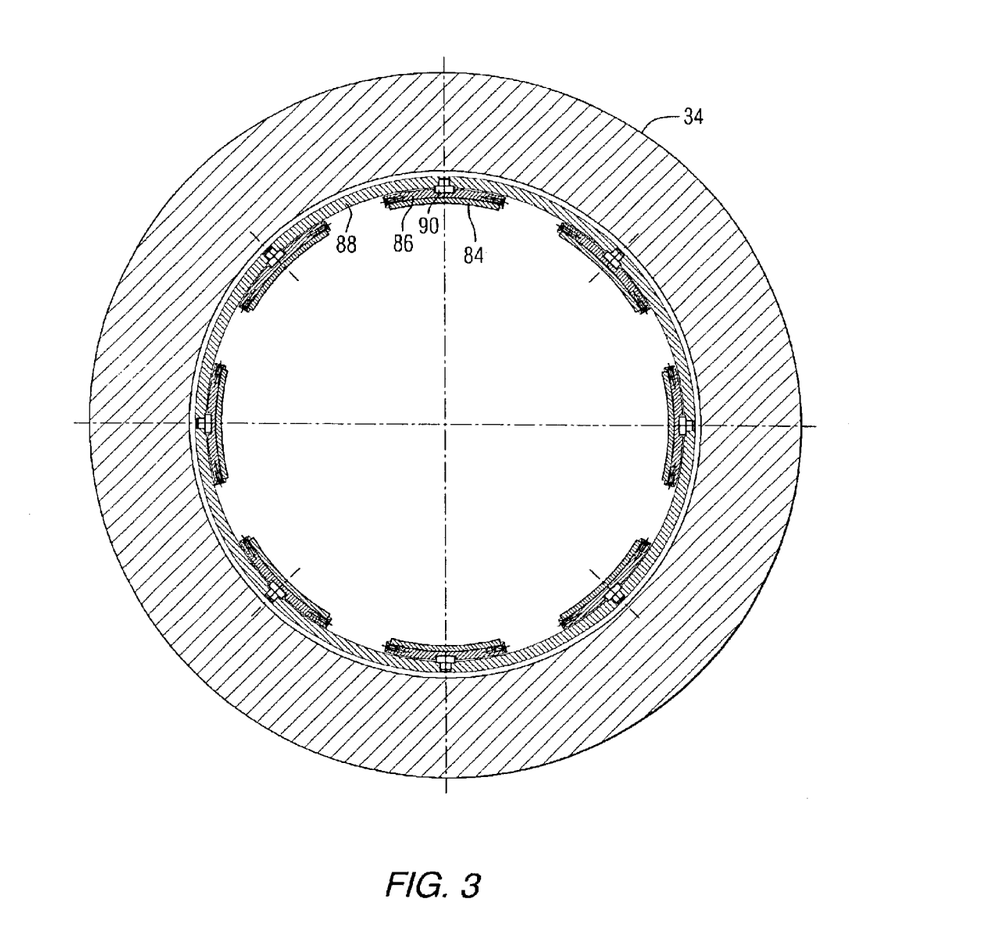
FIG. 3 is a cross-sectional view of the spool pump illustrated in FIG. 2, taken along line 3—3.

FIGS. 2 and 3 illustrate radial bearings 80 that are employed to rotatably support the rotor 64. Radial bearings 80 are mounted between housing 34 and the cylindrical shaft 62. Preferably, radial bearings 80 are located both upstream and downstream of the impeller 60. If the pump 30 is installed such that the coolant flow is vertical, then the radial bearings 80 are self-aligning, pivoted pad type bearings. If the pump 30 is installed such that the coolant flow is horizontal, then the radial bearings 80 may be self-aligning, pivoted pad type bearings, or may be simple solid journal bearings. The configuration shown in FIGS. 2 and 3 is for self-aligning, pivoted pad bearings.

Preferably, the radial bearing journal 82 will be shrink fitted to the cylindrical shaft 62 and will be a 431 stainless steel (or comparable alloy) insert that has been chrome plated or hard faced for corrosion resistance and improved wear properties. When the cylindrical shaft 62 rotates, the radial bearing journal 82 wears against a radial bearing pad 84. The radial bearing pad 84 which may be ceramic material such as carbon graphite sits on a radial bearing retainer 86, which in turn, is mounted into a radial bearing flange 88. The radial bearing flange 88 is mounted to the housing 34. The radial bearing retainer 86 also sits on the radial bearing seat 90, which allows the bearing retainer 86 to pivot, and thus, self-align, as is known in the art.

Figure 4:
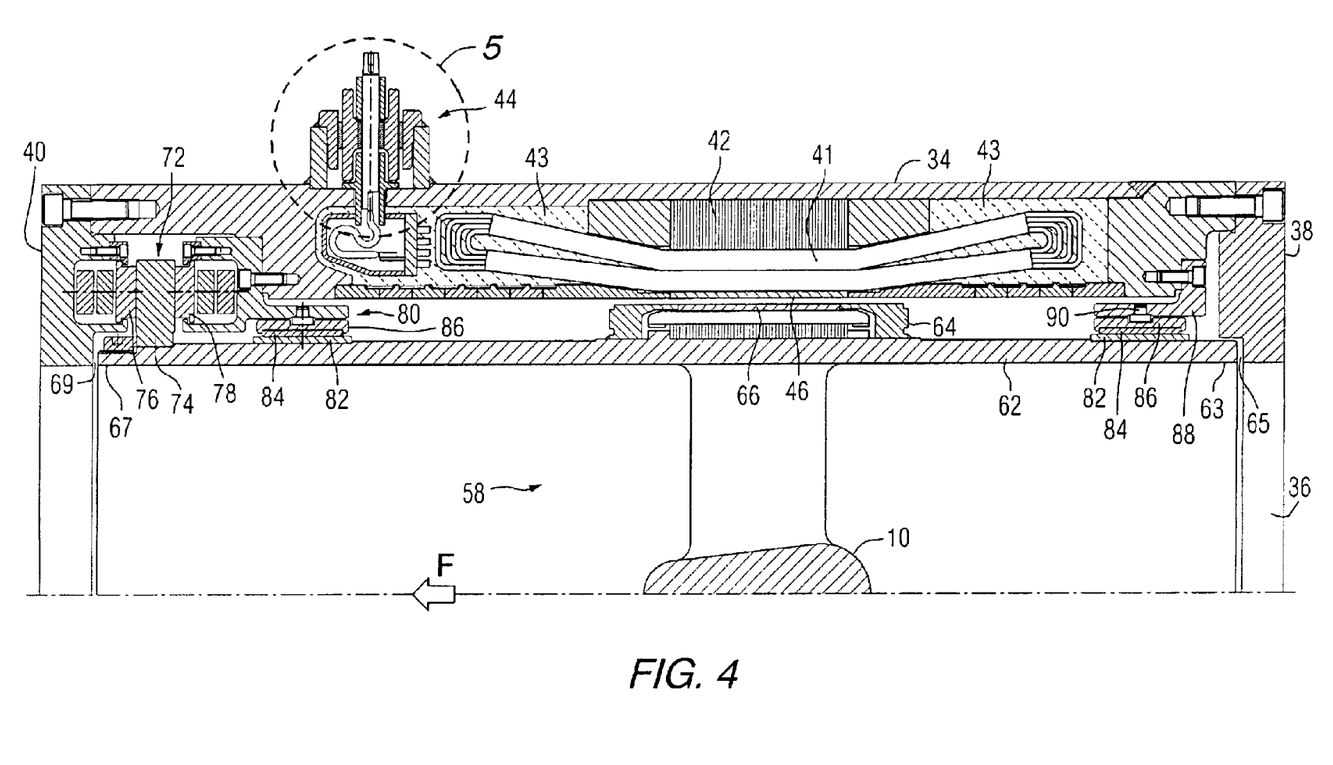
FIG. 4 is a partial, cross-sectional view of an the spool pump illustrated in FIG. 2.

Referring to FIG. 4, when the stator 42 is energized, it causes the impeller assembly 58 to rotate. Pump parts that rotate include the rotor 64, the rotor can 66, the thrust bearing runner 74 (that is shrink fitted on the rotor 64) the radial bearing journal 82 (which is also shrink fitted on the rotor 64), impeller 60 and shaft 62. All other pump parts ideally remain stationary to the impeller assembly 58.

The cylindrical shaft 62 has a forward end 63 that forms a forward gap 65 relative to the end cap 38 on the inlet side of the impeller assembly 58. The cylindrical shaft 62 also has an aft end 67 that forms an aft gap 69 relative to the end cap 40. During operation, water flowing through the cylindrical shaft 62 enters the aft gap 69. The water flows between the thrust bearing runner 74 and the bearing pad 76, and thereby lubricates the thrust bearing runner 74 as it moves relative to the bearing pad 76. Likewise, the water proceeds to flow between, and thereby, lubricate, the bearing pad 78 and the bearing runner 74.

The water proceeds to flow between the radial bearing journal 82 and the radial bearing pad 84 of the radial bearing 80 located on the downstream side of impeller assembly 58. In this way, the water also lubricates and cools the radial bearing 80. The water proceeds through the gap between the rotor can 66 and the stator can 46, thereby cooling the rotor 64 and the stator 42.

The water flows between the radial bearing journal 82 and the radial bearing pad 84 of the radial bearing 80 located on the upstream side of impeller assembly 58, thereby lubricating and cooling the radial bearing 80. Finally, the water proceeds through the forward gap 65 and back into the cylindrical passage 36.

Due to the high reactor coolant temperature mentioned above, as well as the heat generated by the stator windings 41, the stator 42 must have adequate insulation or cooling, otherwise the stator windings 41 may be damaged. Therefore, in accordance with an embodiment of the present invention, the pump 30 further includes insulation 43. The insulation material 43 is disposed around the stator windings 41. The insulation material preferably is rated at 500° C., and comprises a combination of mica, glass and ceramics. The insulation material preferably comprises a plurality of solid pieces of insulation that are shaped so as to fit inside the stator 42 and around the stator windings 41. In prior systems, strips of insulation were laid upon, or taped to, the stator windings. Resin was used to fill the remainder of the stator and hold the insulation in place on the stator windings. However, due to the high temperatures to which the pump 30 will be subjected, resin cannot be used, as it will likely degrade under high temperatures. Thus, in accordance with the present invention, the insulation material will be formed as a plurality of solid pieces that are shaped to fit snugly around the stator windings, similar to pieces of a three-dimensional jigsaw puzzle. In this way, the insulation material will not need resin in order to keep it in contact with the stator windings.

Figure 5:
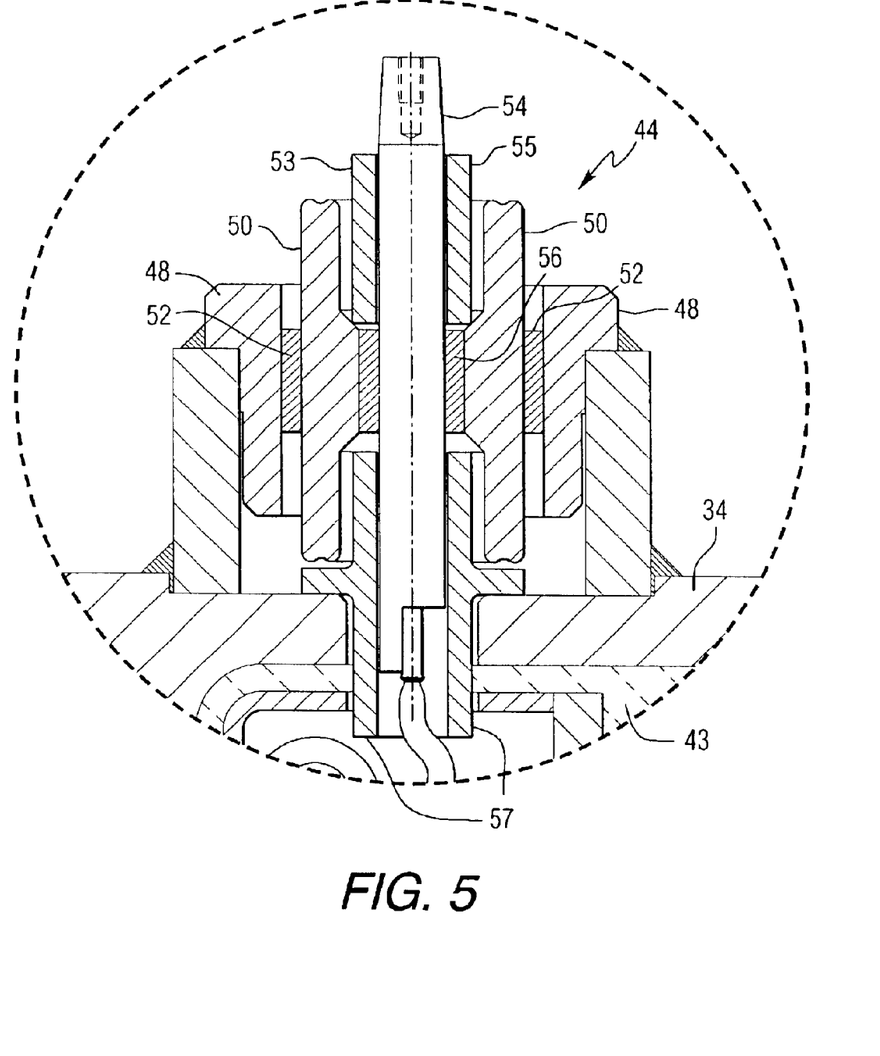
FIG. 5 is a magnified, cross-sectional view of the dashed portion of FIG. 4.

As shown in further detail in FIG. 5, the terminal gland 44 connects the pump 30 to a source of electrical power outside the vessel 12, such as an electric generator (not shown). Terminal gland 44 is part of the pump pressure barrier. As such, the terminal gland 44 must be constructed to withstand design pressures up to approximately 2500 psi. As illustrated in FIG. 5, the terminal gland 44 comprises a body 48 that provides the capability of welding the terminal gland 44 to the housing 34. Preferably, the body 48 is made of stainless steel. The body 48 encases a cylindrical ceramic insulator 50, and is connected to the ceramic insulator 50 by a cylindrical first glass preform 52. Preferably, a ceramic insulator 50 may be used. The ceramic insulator 50, in turn, encases a terminal gland stud 54 through which electrical wires pass though to provide the electrical power to the stator 42. The ceramic insulator 50 is also connected to the terminal gland stud 54 by a second glass preform 56. Preferably, the terminal gland stud 54 is made of a conducting material such as molybdenum or copper. An external ceramic insulating sleeve 55 surrounds the upper portion of the terminal gland stud 54, while an internal ceramic insulating sleeve 57 surrounds the lower portion of the terminal gland stud 54. Due to the various thermal expansion rates of the several materials, the assembly is held together in compression. The compression must be great enough to provide the required sealing integrity. The compression achieved is dictated by the selection of the glass material used for the first and second glass preforms 52, 56. A grade of glass must be chosen such that the terminal gland 44 may operate in a temperature range of between approximately 350° C. and approximately 400° C. Electrical strike and creep distances for air operation is maintained by the ceramic insulator 50 and first and second glass preforms 52, 56 configuration.

Figure 6:
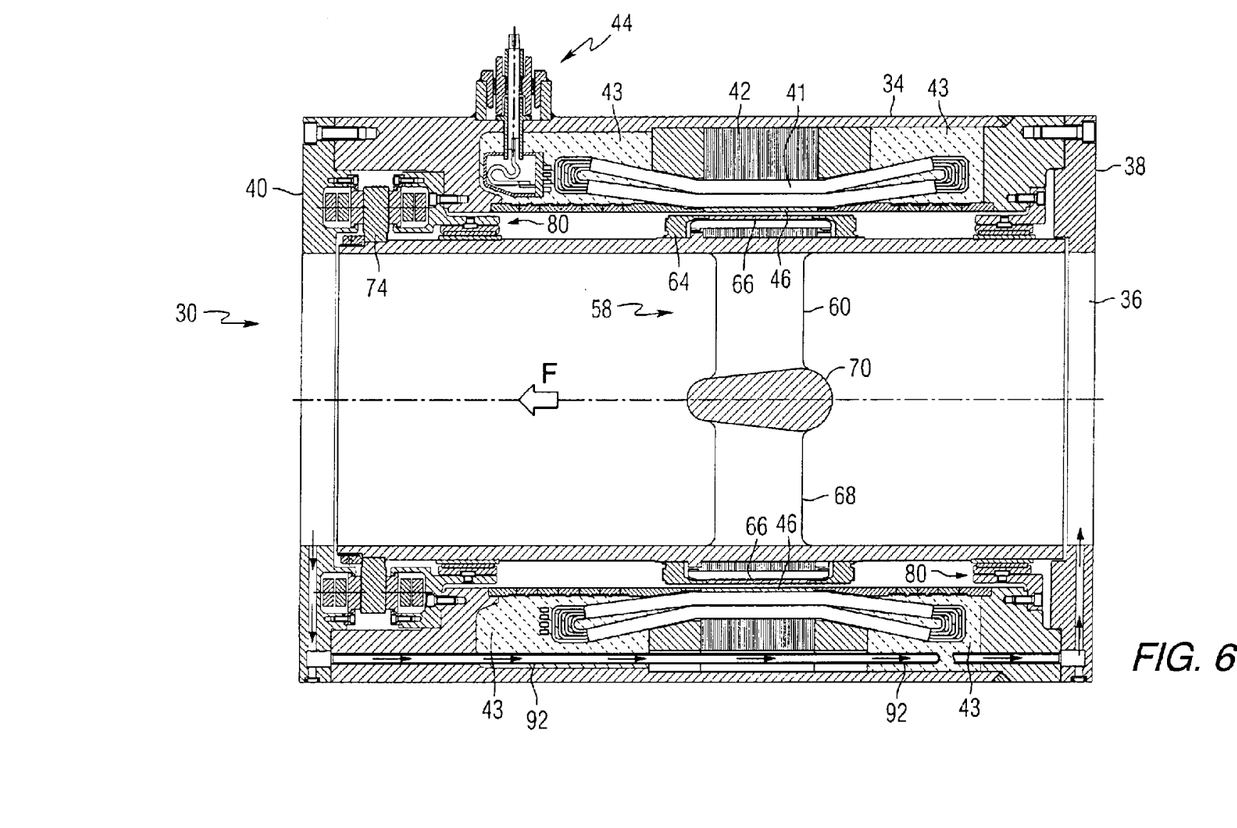
FIG. 6 is a cross-sectional view of an alternate spool pump.

Should further motor cooling be desirable, the pump 30 may be provided with cooling tubes 92, as illustrated in FIG. 6. The cooling tubes 92 act as a heat exchanger to transfer heat from the stator 42 to the reactor coolant. The cooling tubes 92 are disposed within the end cap 40 of the downstream end of the pump 30, run through the housing 34, through the "back iron" area of the stator 42, and through the end cap 38 at the upstream end of the pump 30. The reactor coolant enters the cooling tubes 92 at the downstream end of the pump 30, where the reactor coolant is at a higher pressure than at the upstream end of the pump 30. The pressure difference is enough to drive the reactor coolant through the cooling tubes 92. Preferably, the cooling tubes 92 are made from stainless steel, Inconel or other non-magnetic alloy. The reactor coolant flows through the cooling tubes 92 and absorbs heat from the stator 42, which will typically be operating at a higher temperature than the reactor coolant. If a higher cooling capacity is required, cooling tubes may be installed in the stator slots. Externally-supplied cooling water, from outside reactor vessel 12, may also be provided, if necessary.

Figure 7:
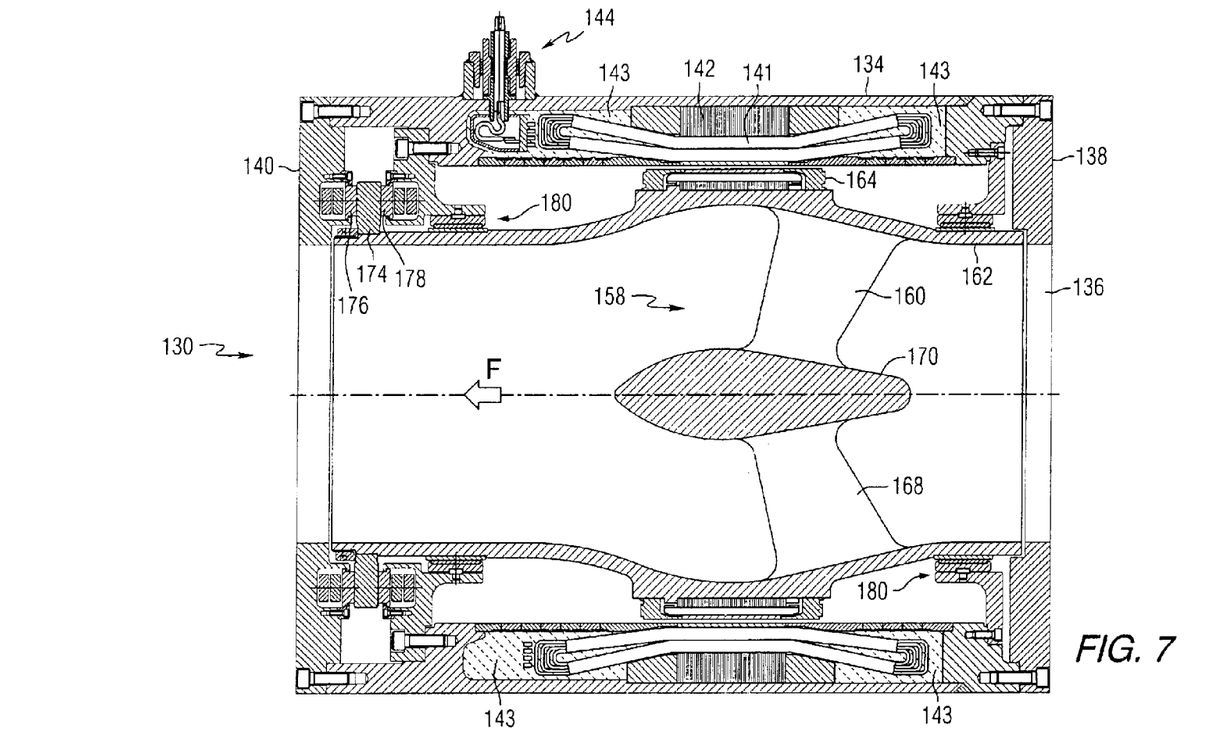
FIG. 7 is a cross-sectional view of an alternate spool pump.
Figure 8:
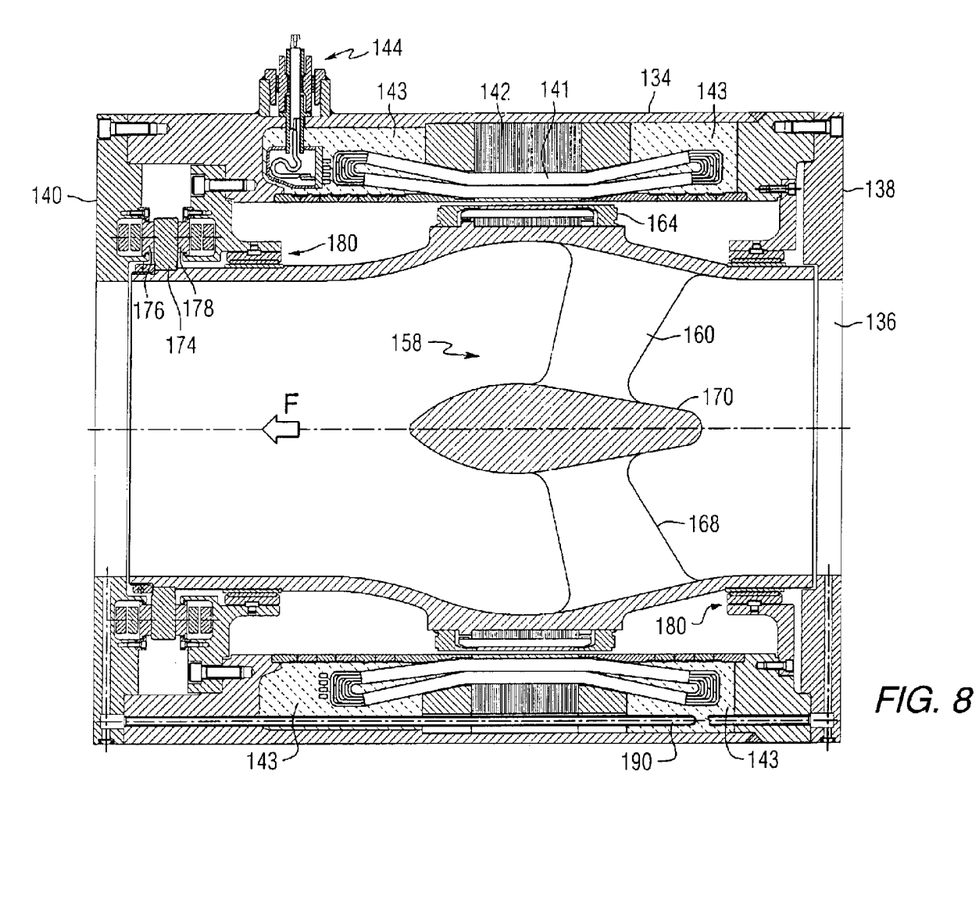
FIG. 8 is a cross-sectional view of an alternate spool pump.

An alternate embodiment of the present invention is illustrated in FIG. 7. It is noted that the embodiments illustrated in FIGS. 7 and 8 are comparable to the embodiments illustrated in FIGS. 2 and 3, respectively, with similar parts referenced by similar reference numbers, increased by a factor of 100. In this embodiment, the impeller assembly 158 is designed to produce a mixed flow, as is known to those of skill in the art. Generally, the cylindrical hub 170, is moved downstream relative to the blades 168. Further, the blades are pitched so as to create a mixed flow in the pumped fluid in the direction F through the passage 136 in the housing 134 when the impeller assembly 158 is rotated. Also, the cylindrical shaft 162 is narrowed in most areas except for the area corresponding to the position of the cylindrical hub 170, as illustrated in FIG. 7. In this configuration, the impeller assembly 158 yields a specific speed of about 5,000 to about 9,000 at a speed of 1800 rpm.

Should further motor cooling be desirable for the pump 130 illustrated in FIG. 7, the pump 130 may be provided with cooling tubes 190, as illustrated in FIG. 8. The cooling tubes 190 act as a heat exchanger to transfer heat from the stator 142 to the reactor coolant. The cooling tubes 190 are disposed within the end cap 140 of the downstream end of the pump 130, run through the housing 134, through the "back iron" area of the stator 130, and through the end cap 138 at the upstream end of the pump 130. The reactor coolant enters the cooling tubes 190 at the downstream end of the pump 130, where the reactor coolant is at a higher pressure than at the upstream end of the pump 130. The pressure difference is enough to drive the reactor coolant through the cooling tubes 190. Preferably, the cooling tubes 190 are made from stainless steel, Inconel or other non-magnetic alloy. The reactor coolant flows through the cooling tubes 190 and absorbs heat from the stator 142, which will typically be operating at a higher temperature than the reactor coolant. If a higher cooling capacity is required, cooling tubes may be installed in the stator slots. Externally-supplied cooling water may also be provided, if necessary.

While specific embodiments and methods for practicing this invention have been described in detail, those skilled in the art will recognize various manifestations and details that could be developed in light of the overall teachings herein. Accordingly, the particular mechanisms disclosed are meant to be illustrative only and not to limit the scope of the invention which is to be given the full breadth of the following claims and any and all embodiments thereof.

What is claimed is:

1. A nuclear reactor comprising a reactor vessel, nuclear fuel, a plurality of control rods, reactor coolant, at least one steam generator, a first pipe penetrating a wall of said reactor vessel and connected to a first inlet of said steam generator and at least one reactor coolant pump including a motor, said pump connected to a second inlet of said steam generator, wherein said nuclear fuel, said control rods, said reactor coolant, said steam generator and said reactor coolant pump including said motor are all located inside said reactor vessel, said pump comprising:

a housing;

an annular stator disposed in said housing and having a generally cylindrical passage extending therethrough and a plurality of stator windings, said stator having energizing means for electrically connecting a source of electrical power to said plurality of stator windings;

an axial flow impeller assembly rotatably mounted in said generally cylindrical passage in said stator, said impeller assembly comprising an impeller and a sealed rotor mounted around the perimeter of said impeller and positioned inside said stator to form an electric motor, the operation of which rotates said impeller to produce a pressurized flow of fluid through said generally cylindrical passage;

at least one radial bearing mounted between said impeller assembly and said housing;

a thrust bearing mounted between said impeller assembly and said housing and located downstream from said rotor;

a shaft centrally positioned in said generally cylindrical passage in said housing and secured to said rotor;

said impeller assembly rotatably supported by said shaft; and insulation material disposed within said stator, said insulation material comprising a plurality of solid pieces of mica, glass and ceramic insulation tightly packed within said stator.

2. The reactor of claim 1, further comprising a second pipe penetrating a wall of said reactor vessel, wherein said second pipe is connected to an outlet of said steam generator.

3. The reactor of claim 2, wherein six steam generators are located inside said reactor vessel.

4. The reactor of claim 3, wherein six reactor coolant pumps are located inside said reactor vessel and are each connected to an inlet of one of said six steam generators.

5. The reactor of claim 4, wherein said thrust bearing comprises a bearing runner and a pair of bearing pads.

6. A nuclear reactor comprising a reactor vessel, nuclear fuel, a plurality of control rods, reactor coolant, at least one steam generator, and at least one reactor coolant pump including a motor, said pump connected to the inlet of said steam generator, wherein said nuclear fuel, said control rods, said reactor coolant, said steam generator and said reactor coolant pump including said motor are all located inside said reactor vessel; said pump comprising:

a housing;

an annular stator disposed in said housing and having a generally cylindrical passage extending therethrough and a plurality of stator windings, said stator having energizing means for electrically connecting a source of electrical power to said plurality of stator windings;

an axial flow impeller assembly rotatably mounted in said generally cylindrical passage in said stator, said impeller assembly comprising an impeller and a sealed rotor mounted around the perimeter of said impeller and positioned inside said stator to form an electric motor, the operation of which rotates said impeller to produce a pressurized flow of fluid through said generally cylindrical passage;

at least one radial bearing mounted between said impeller assembly and said housing;

a thrust bearing mounted between said impeller assembly and said housing and located downstream from said rotor;

a shaft centrally positioned in said generally cylindrical passage in said housing and secured to said rotor;

said impeller assembly rotatably supported by said shaft;

insulation material disposed within said stator, said insulation material comprising a plurality of solid pieces of insulation tightly packed within said stator; and wherein said energizing means comprises a terminal gland capable of withstanding a pressure of approximately 2500 psi connected to an electrical power source, said terminal gland comprising a stainless steel body, said body attached to an alumina ceramic insulator by a first glass preform, said ceramic insulator attached to a terminal gland stud by a second glass preform.

* * * * *